(12) United States Patent
Blazejewski et al.

(10) Patent No.: US 7,162,686 B2
(45) Date of Patent: Jan. 9, 2007

(54) SYSTEM AND METHOD FOR NAVIGATING SEARCH RESULTS

(75) Inventors: Edward Blazejewski, Yardley, PA (US); Chao-Hen Kuo, Devon, PA (US); Joseph Kenney, Mount Laurel, NJ (US); Thomas Angle, Newtown, PA (US)

(73) Assignee: Computer Associates Think, Inc., Islandia, NY (US)

( * ) Notice: Subject to any disclaimer, the term of this patent is extended or adjusted under 35 U.S.C. 154(b) by 495 days.

(21) Appl. No.: 10/418,880

(22) Filed: Apr. 18, 2003

(65) Prior Publication Data

US 2003/0226104 A1    Dec. 4, 2003

Related U.S. Application Data

(60) Provisional application No. 60/374,115, filed on Apr. 19, 2002.

(51) Int. Cl.
*G06F 17/00* (2006.01)

(52) U.S. Cl. ............... 715/500; 715/713; 715/501.1

(58) Field of Classification Search .......... 715/500, 715/544, 738, 713, 501.1, 513; 707/5, 104.1
See application file for complete search history.

(56) References Cited

U.S. PATENT DOCUMENTS

| | | | | |
|---|---|---|---|---|
| 5,819,301 A | * | 10/1998 | Rowe et al. ............ 715/513 |
| 5,857,185 A | | 1/1999 | Yamaura ................ 707/5 |
| 5,940,846 A | * | 8/1999 | Akiyama ............... 715/539 |
| 6,006,217 A | | 12/1999 | Lumsden ............... 707/2 |
| 6,012,055 A | * | 1/2000 | Campbell et al. ......... 707/5 |
| 6,070,157 A | | 5/2000 | Jacobson et al. .......... 707/1 |
| 6,098,081 A | * | 8/2000 | Heidorn et al. ......... 715/501.1 |
| 6,101,503 A | * | 8/2000 | Cooper et al. .......... 707/104.1 |
| 6,122,647 A | * | 9/2000 | Horowitz et al. .......... 715/513 |
| 6,134,568 A | | 10/2000 | Tonkin ................ 715/526 |
| 6,167,397 A | | 12/2000 | Jacobson et al. .......... 707/5 |
| 6,292,802 B1 | | 9/2001 | Kessenich et al. ......... 707/101 |
| 6,301,576 B1 | | 10/2001 | Wolfe ................ 707/5 |
| 6,353,448 B1 | * | 3/2002 | Scarborough et al. ...... 715/744 |
| 6,377,946 B1 | | 4/2002 | Okamoto et al. ......... 707/5 |
| 6,434,556 B1 | * | 8/2002 | Levin et al. ........... 707/5 |
| 6,442,598 B1 | | 8/2002 | Wright et al. ........... 709/217 |
| 6,532,469 B1 | | 3/2003 | Feldman et al. ......... 707/102 |
| 6,618,758 B1 | | 9/2003 | Ubowski .............. 709/232 |

(Continued)

FOREIGN PATENT DOCUMENTS

WO    WO 00/65482    11/2000

OTHER PUBLICATIONS

Newfield et al.,"Scratchpad: Mechanisms for Better Navigation in Directed Web Searching", UIST '98, 1998, ACM, pp. 1-8.*

(Continued)

*Primary Examiner*—William Bashore
*Assistant Examiner*—J H Blackwell
(74) *Attorney, Agent, or Firm*—Pillsbury Winthrop Shaw Pittman, LLP (57) ABSTRACT

A method for navigating search results includes identifying a first occurrence and a second occurrence of at least one search term in a document. The method also includes generating a web page comprising at least a portion of the document. The first occurrence appears as a hyperlink in the web page. The hyperlink is associated with a position of the second occurrence. The method further includes communicating the web page for display to a user.

30 Claims, 5 Drawing Sheets

U.S. PATENT DOCUMENTS

| | | | |
|---|---|---|---|
| 6,819,339 B1 * | 11/2004 | Dowling | 715/738 |
| 6,848,077 B1 * | 1/2005 | McBrearty et al. | 715/501.1 |
| 6,862,710 B1 * | 3/2005 | Marchisio | 715/501.1 |
| 2005/0086248 A1 * | 4/2005 | Atchison | 707/102 |
| 2005/0177595 A1 * | 8/2005 | Kreig et al. | 707/104.1 |

OTHER PUBLICATIONS

International Search Report for PCT/US03/12105 filed Apr. 18, 2003, 6 pages, Oct. 2, 2003.

* cited by examiner

SYSTEM AND METHOD FOR NAVIGATING SEARCH RESULTS

RELATED APPLICATIONS

This application claims priority to U.S. Provisional Application No. 60/374,115 filed Apr. 19, 2002, and entitled "System and Method for Navigating Search Results", which is incorporated by reference herein.

TECHNICAL FIELD

This disclosure relates generally to the field of database systems, and more particularly to a system and method for navigating search results.

BACKGROUND

Conventional database systems allow users to search the contents of a database for particular keywords or search terms. For example, a database used by a bank may include a report listing transactions involving the customers of the bank. The database system may receive one or more search terms, such as a customer's name or account number, from a user and identify any occurrences of the specified search terms in the report. If the database system locates any occurrences of the search terms, the database system typically makes the report available to the user. A problem with convention database systems involves locating the occurrences of the search terms in the report. The user is often forced to scroll through the report and manually locate the specified search terms, which may be difficult and time consuming. The user could also use a "Find" function to search for the specified terms in the report. This forces the user to type in the search terms twice, which is also time consuming and increases the likelihood of typographical errors.

SUMMARY

The present disclosure provides a system and method for navigating search results. In particular, the system locates a document containing one or more search terms and displays some or all of the document to a user. The system also links each occurrence of a search term in the document to the next occurrence of a search term. In addition, the system may provide a link that allows the user to jump to the first occurrence of a search term in the document.

In one embodiment, a method for navigating search results includes identifying a first occurrence and a second occurrence of at least one search term in a document. The method also includes generating a web page comprising at least a portion of the document. The first occurrence appears as a hyperlink in the web page. The hyperlink is associated with a position of the second occurrence. The method further includes communicating the web page for display to a user.

In a particular embodiment, the hyperlink comprises a first hyperlink. Also, the web page further comprises a second hyperlink at a beginning of the at least a portion of the document, a third hyperlink at an end of the at least a portion of the document, and a fourth hyperlink at the end of the at least a portion of the document. The second hyperlink is associated with a position of the first occurrence. The third hyperlink is associated with the position of the first occurrence. The fourth hyperlink is associated with a position of the beginning of the at least a portion of the document. In addition, the second occurrence appears as a fifth hyperlink in the web page. The fifth hyperlink is associated with a position of the third and fourth hyperlinks.

BRIEF DESCRIPTION OF THE DRAWINGS

For a more complete understanding of this disclosure, reference is now made to the following descriptions, taken in conjunction with the accompanying drawings, in which.

DETAILED DESCRIPTION OF EXAMPLE EMBODIMENTS

Figures 1, 4:
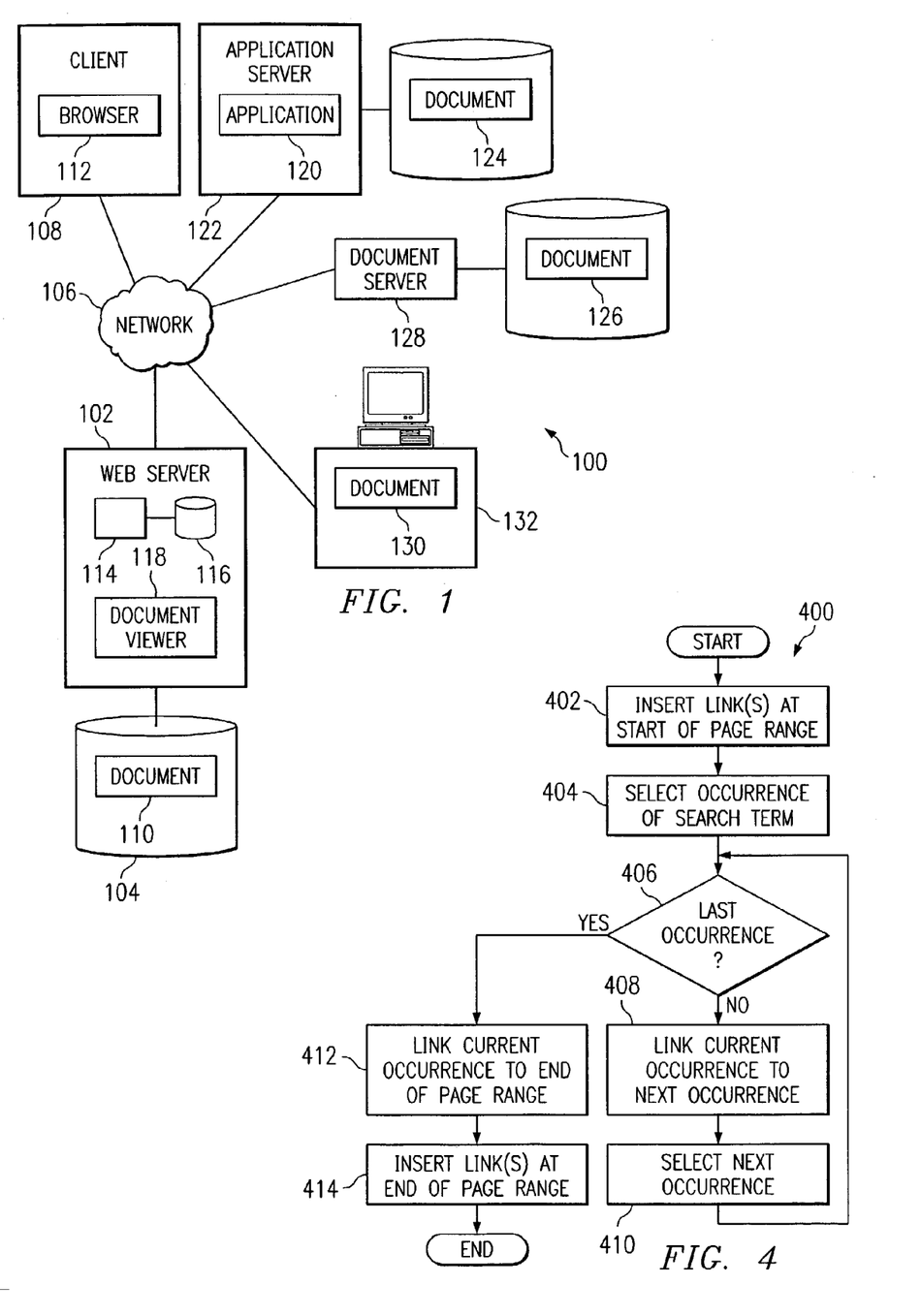
FIG. 1 is an exemplary block diagram illustrating an example system for navigating search results according to one embodiment of this disclosure.
FIG. 4 is an exemplary flow diagram illustrating an example method for linking search results according to one embodiment of this disclosure.

FIG. 1 is an exemplary block diagram illustrating an example system 100 for navigating search results according to one embodiment of this disclosure. In the illustrated embodiment, system 100 includes a web server 102, a document database 104, a network 106, and a client 108. Other embodiments of system 100 may be used without departing from the scope of this disclosure.

In one aspect of operation, server 102 receives one or more search terms from a client 108, such as from a user using client 108. Server 102 searches the contents of one or more documents 110 for the search terms. If a document 110 contains the specified search terms, server 102 communicates all or a portion of the document 110 to client 108, and client 108 displays the document 110 to the user.

To help the user locate the occurrences of the search terms in the selected document 110, server 102 inserts a hyperlink ("link") at the beginning of the selected document 110. The link allows the user using client 108 to jump to the first occurrence of the search term in the retrieved portion of document 110. For example, client 108 could jump to the first occurrence of the search term by repositioning the displayed portion of document 110 so that the search term is visible to the user. Server 102 also links each occurrence of a search term in document 110 with the next occurrence of a search term, if any. This allows the user using client 108 to jump from one instance of a search term to the next instance of a search term in document 110. At the end of the displayed portion of document 110, server 102 inserts one or more additional links. One link allows the user to jump to the beginning of the retrieved portion of document 110, while another link allows the user to jump to the first occurrence of a search term in document 110. By linking occurrences of the search terms and providing the additional links, server 102 allows a user using client 108 to quickly and easily locate occurrences of search terms in document 110.

In the illustrated embodiment, server 102 is coupled to database 104 and network 106. In this specification, the term "couple" refers to any direct or indirect communication between two or more components, whether or not those components are in physical contact with one another. Also, the term "communication" refers to communication between physically separate components or between components within a single physical unit. Server 102 performs one or more functions related to searching documents 110 and navigating the search results. Server 102 may include any hardware, software, firmware, or combination thereof operable to perform searching and navigating functions in system 100.

Database 104 is coupled to server 102. Database 104 stores and facilitates retrieval of information used by server 102. For example, database 104 may store one or more documents 110. In this specification, the term "documents" refers to text files, electronic word processing files, spreadsheet files, electronic mail messages, web pages, or any other medium containing informational content. Database 104 may include any hardware, software, firmware, or combination thereof operable to store and facilitate retrieval of information. Also, database 104 may use any of a variety of data structures, arrangements, and compilations to store and facilitate retrieval of information.

Network 106 is coupled to server 102 and client 108. Network 106 facilitates communication between components of system 100. For example, network 106 may communicate Internet Protocol (IP) packets, frame relay frames, Asynchronous Transfer Mode (ATM) cells, or other suitable information between network addresses. Network 106 may include one or more local area networks (LANs), metropolitan area networks (MANs), wide area networks (WANs), all or a portion of a global network such as the Internet, or any other communication system or systems at one or more locations.

Client 108 is coupled to network 106. Client 108 may perform any of a variety of functions in system 100. For example, client 108 could allow a user to submit a query to server 102, where the query includes one or more search terms. Server 102 searches one or more documents 110 for the search terms contained in the query and returns the results of the query to client 108. Client 108 displays the results of the query to the user, such as by displaying part or all of a document 110 containing the search terms. Client 108 may include any hardware, software, firmware, or combination thereof operable to communicate with server 102. In the illustrated example, client 108 includes a web browser 112, which may display documents 110 within web pages received from server 102. Browser 112 may include any suitable browser operating in any suitable operating system. Also, different clients 108 may execute different browsers 112 in different operating systems.

In the illustrated example, server 102 includes a processor 114 and a memory 116. Processor 114 executes instructions and manipulates data to perform the operations of server 102. Although FIG. 1 illustrates a single processor 114 in server 102, multiple processors 114 may be used according to particular needs. Memory 116 stores and facilitates retrieval of information used by processor 114 to perform the functions of server 102. Memory 116 may, for example, store instructions to be performed by processor 114 and data used by processor 114. Memory 116 may include any hardware, software, firmware, or combination thereof operable to store and facilitate retrieval of information.

Figure 2A:
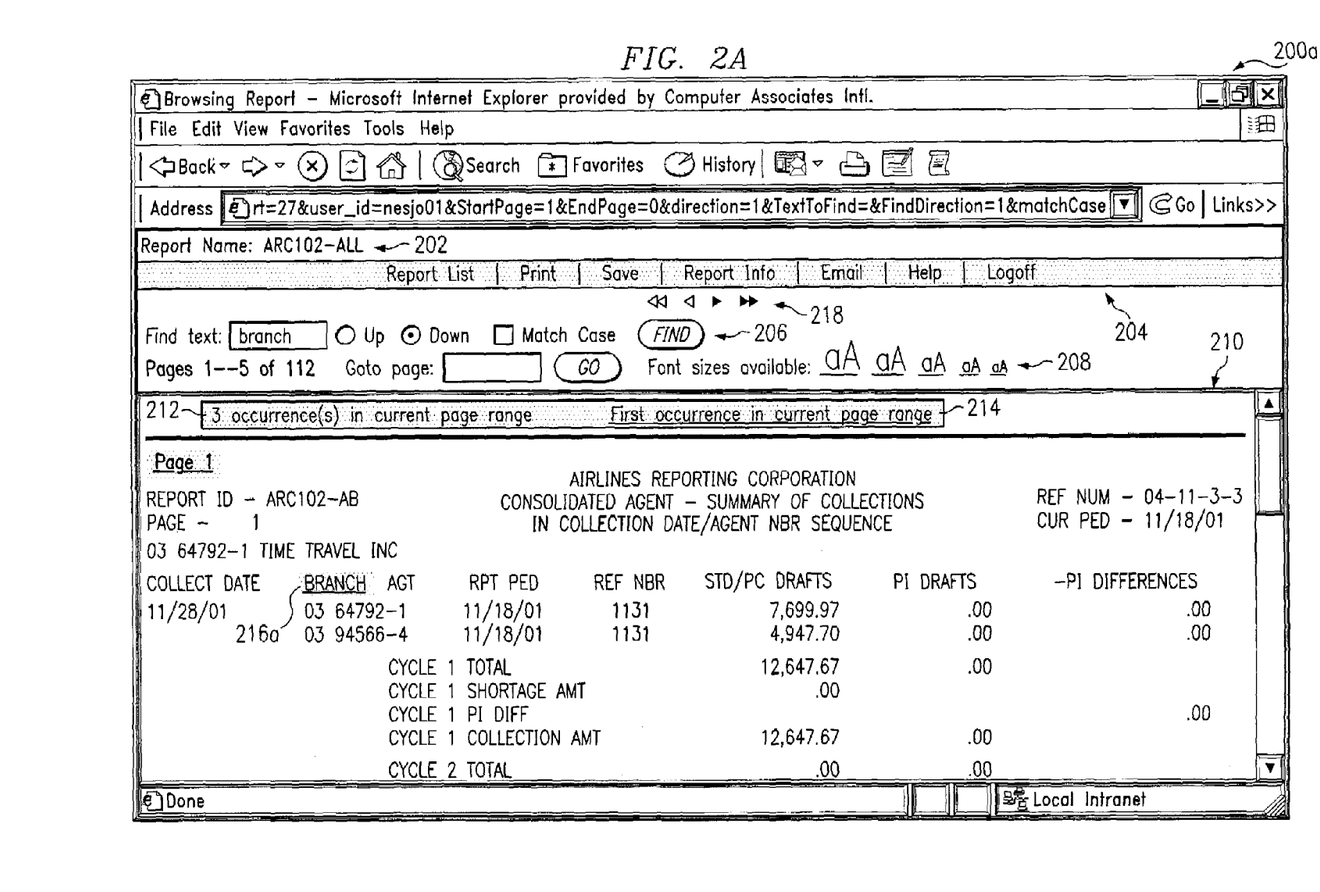
FIGS. 2A through 2C are exemplary block diagrams illustrating example search results according to one embodiment of this disclosure.
Figure 2B:
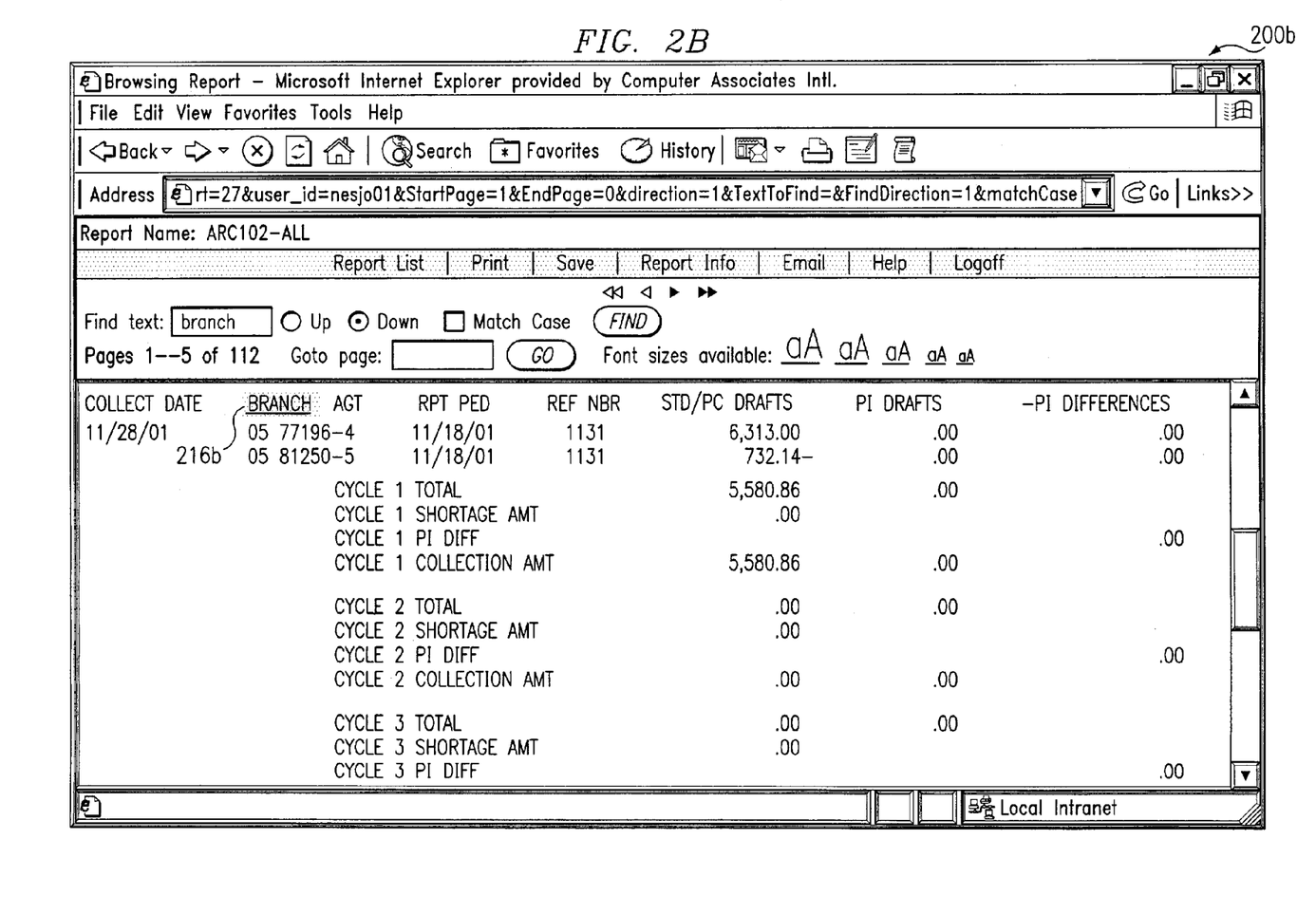
Figure 2C:
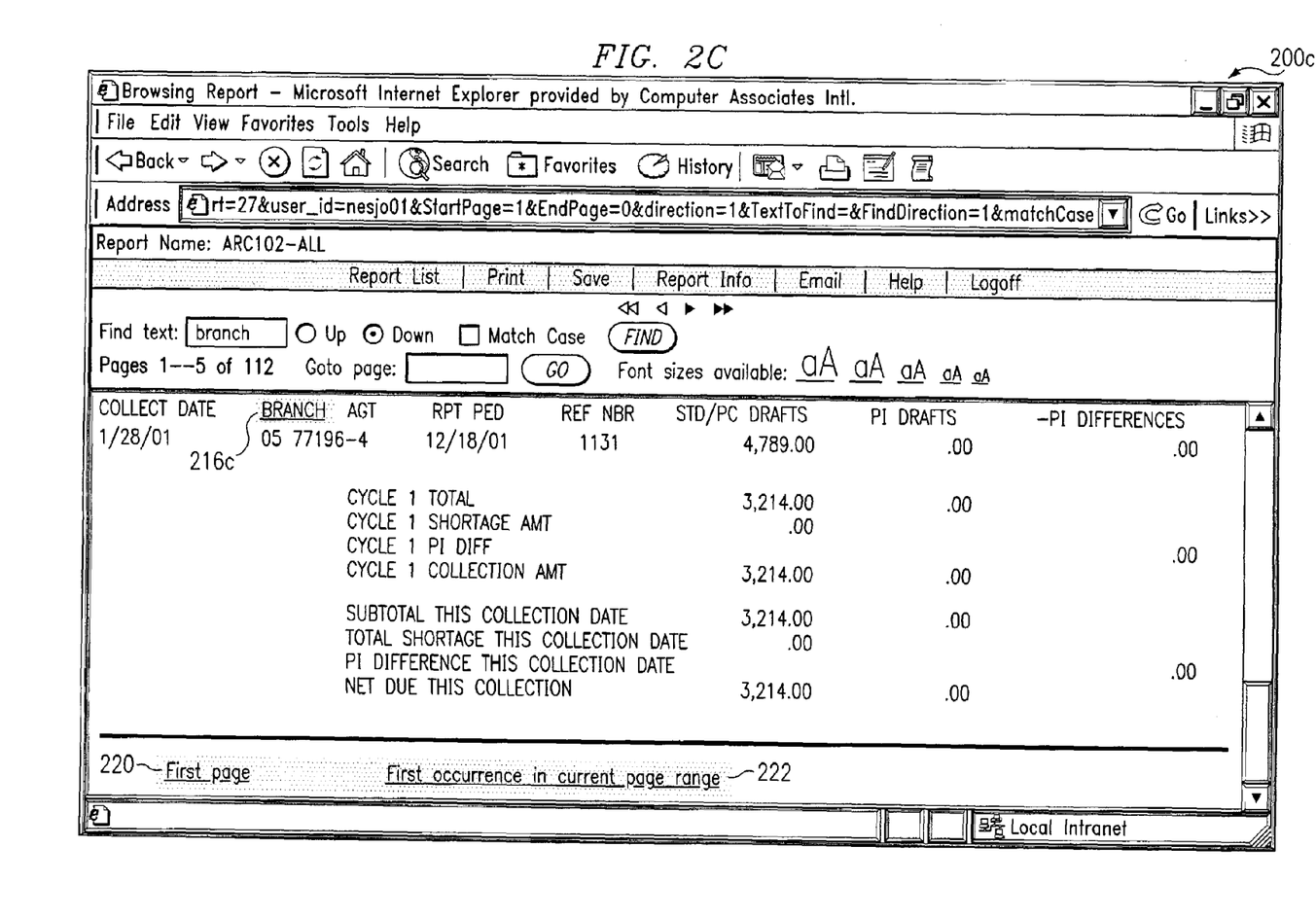

In the illustrated embodiment, server 102 includes a document viewer 118. Viewer 118 is operable to receive one or more search terms, perform a search, and make the results of the search available to a user. For example, viewer 118 may communicate a web page to browser 112 of client 108, where the web page includes a form allowing the user to enter the search terms. Viewer 118 searches the contents of one or more documents 110 for the specified search terms. If viewer 118 locates a document 110 that contains the search terms, viewer 118 makes all or a portion of the document 110 available to the user at client 108. For example, viewer 118 may communicate a web page containing a portion of the identified document 110 to client 108. In a particular embodiment, the text and formatting of the document 110 is not changed when the retrieved portion of that document 110 is displayed to the user at client 108. Example web pages containing a portion of a document 110 are shown in FIGS. 2A through 2C, which are described below.

The search performed by viewer 118 may vary according to particular needs. For example, the user using client 108 could already be viewing a document 110, and the user may wish to locate a search term in the displayed document 110. In this case, viewer 118 could search that particular document 110 for the search term. As another example, the user using client 108 could request a search of all or a subset of the documents 110 in database 104 or other location in system 100. In that case, if multiple documents 110 contain the search term, viewer 118 may communicate a list of the documents 110 to client 108, allow the user to select a document 110 for viewing, and communicate a web page containing at least a portion of the selected document 110 to client 108. As yet another example, the user may perform one search and then request a second search that refines the results of the first search. In this case, viewer 118 would search the documents 110 previously found during the first search. Other or additional searches can be performed in system 100.

In one embodiment, each document 110 includes one or more pages of information, such as pages of text. In this specification, the term "page" refers to any suitable subdivision of a document. Also, in this specification, the term "each" refers to each of at least a subset of the identified items. In this embodiment, when viewer 118 locates a document 110 containing the specified search terms, viewer 118 may communicate a limited number of pages from that document 110 to client 108. In a particular embodiment, viewer 118 begins searching a document 110 for the first page containing an occurrence of any search term. When viewer 118 locates the first page containing an occurrence of a search term, viewer 118 retrieves a range of pages from document 110, beginning with the identified first page. Viewer 118 communicates the page range from document 110 to client 108, and viewer 118 may continue searching the remaining portion of document 110 for additional occurrences of the search terms. If viewer 118 locates another occurrence of a search term in the remaining portion of document 110, viewer 118 may retrieve another range of pages from document 110 and communicate the pages to client 108.

By communicating a range of pages from document 110 to client 108 after finding the first occurrence of a search term, viewer 118 may provide search results to client 108 in a more timely manner. For example, a document 110 could include millions of pages of text. By providing the user using client 108 with a portion of the document 110 containing a search term, the user need not wait for viewer 118 to search the entire document 110 before receiving the search results. In a particular embodiment, the number of pages in the page range may be set by a system administrator, by the user as a default setting, by the user as a setting for a particular search, or in any other suitable manner. In another embodiment, viewer 118 may send the entire document 110 to client 108 without dividing the document 110 into multiple portions. Although the following description may assume that viewer 118 sends portions of a document 110 to client 108, the same or similar functionality may operate when the document 110 is sent to client 108 as a whole.

To help the user locate the search terms in the retrieved portion of a document 110, viewer 118 provides one or more links that allow the user to jump to the occurrences of the search terms. A link is an object residing at a first location in a web page that is associated with a second location in the web page. For example, the link may be directly associated with the second location in the web page. The link may also be indirectly associated with the second location, such as when the link is associated with an object that resides at the second location. A user using client 108 may select the link, such as by clicking on the link with a computer mouse. When that occurs, browser 112 jumps to the second location by repositioning the content of the web page so that the second location, and any information at that location, is displayed to the user. In a particular embodiment, the web page includes one or more frames. In this embodiment, browser 112 may reposition the content of one frame without altering the displayed content of the other frames.

In one embodiment, viewer 118 treats each occurrence of a search term in the retrieved portion of document 110 as a link to the next occurrence of a search term (if any) in the retrieved portion of document 110. In a particular embodiment, each occurrence of a search term in the retrieved portion of document 110 becomes a Hypertext Markup Language (HTML) "href" hyperlink to the next occurrence of a search term in the retrieved portion of document 110. When the retrieved portion of document 110 is displayed within a web page by browser 112, each occurrence of a search term is highlighted and underlined, or otherwise identified as a link that can be selected by the user of client 108. If the user selects one of the occurrences, such as by clicking on one of the occurrences with a computer mouse, browser 112 repositions the content of the web page so that the next occurrence of a search term is displayed to the user. The user can then click on the next occurrence of a search term, which causes browser 112 to reposition the content of the web page so that the third occurrence of a search term is displayed to the user. This process may continue until the last occurrence of a search term in the retrieved portion of document 110 is displayed to the user.

Viewer 118 may also help the user to locate the first occurrence of a search term in the retrieved portion of document 110 by providing a link to the first occurrence. For example, this link may be inserted and displayed at the beginning of the retrieved portion of document 110. When the user using client 118 selects this link, browser 112 repositions the content of the web page so that the first occurrence of a search term is displayed to the user. Because the first occurrence of a search term is linked to the next occurrence of the search term, the user may then traverse the retrieved portion of document 110 and locate the remaining occurrences of the search terms. The use of a link at the beginning of the retrieved portion of document 110 may be useful when the first occurrence of a search term is not visible to the user when the retrieved portion is initially displayed.

In addition, viewer 118 may provide an additional link or links at the bottom of the retrieved portion of document 110. For example, one link may cause browser 112 to jump to the beginning of the current portion of document 110. Another link may cause browser 112 to jump to the first occurrence of a search term in the retrieved portion of document 110. In a particular embodiment, the last occurrence of a search term in the retrieved portion of document 110 may be linked to the area of the web page containing these links. When the user using client 110 selects the link representing the last occurrence of a search term, browser 112 repositions the content of the web page so that these links are displayed to the user.

By providing various links to and between occurrences of search terms, viewer 118 provides a convenient mechanism by which a user using client 108 can navigate a retrieved portion of a document and locate the occurrences of search terms. The user is not required to retype the search terms into a "Find" function of browser 112, and the user need not manually scroll through a document 110 to locate the occurrences of search terms.

Although viewer 118 has been described as residing in a server 102 coupled to a database 104, additional operational environments can be used in place of or in addition to the illustrated environment. For example, viewer 118 may use cooperative processing in conjunction with another application, such as an application 120 executed by an application server 122. Using cooperative processing, the documents 124 supported by application 120 are accessible to viewer 118 as if they resided on database 104. Viewer 118 may also be used to process distributed documents, such as documents 126 managed by distributed document servers 128 in system 100. In addition, viewer 118 may access and process documents 130 residing in a computing device 132, such as a desktop computer or another networked device in system 100. Viewer 118 may operate in a combination or a subset of these or other environments.

Although FIG. 1 illustrates one example embodiment of a system 100 for navigating search results, various changes may be made to system 100. For example, while FIG. 1 illustrates a client-server embodiment, other distributed or non-distributed embodiments may also be used. Also, while FIG. 1 illustrates viewer 118 as a single component in server 102, viewer 118 could be divided into multiple modules, each performing one or more functions described with respect to viewer 118. As a particular example, viewer 118 could be subdivided into a search module for searching documents 110 and a navigation module for inserting links into retrieved documents 110. In addition, while viewer 118 has been described as inserting specific links into specific locations of a web page, the links may reside at any suitable location, and other or additional links may be used.

FIGS. 2A through 2C are exemplary block diagrams illustrating example search results according to one embodiment of this disclosure. In particular, FIGS. 2A through 2C illustrate screen shots 200a–200c showing example search results. While FIGS. 2A through 2C may be described with respect to viewer 118 of FIG. 1, FIGS. 2A through 2C may be supported by any suitable system.

In FIG. 2A, screen shot 200a includes a document name 202, functions 204, search function 206, page range indicator 208, and document display 210. Document name 202 identifies the name of the document 110 displayed in document display 210. Any suitable identifier, such as an alphanumeric name, may be used as document name 202.

Functions 204 identify various functions that can be performed on behalf of the user using client 108. For example, one function 204 generates a report list, which may include a list of all documents 110 located by viewer 118 containing the specified search terms. Other functions 204 allow the user to print the document 110, save the document 110 as a file, display information associated with the document 110, and email the document 110 to an email address.

Other functions 204 include viewing a help menu and logging the user out of system 100. In addition, functions 204 include skip functions 218. Skip functions 218 allow the user to skip to the beginning of document 110, skip to the previous page range (if any) received from server 102, skip to the next page range (if any) received from server 102, and skip to the end of document 110.

Search function 206 allows the user to search for one or more search terms in the document 110 identified by document name 202. The search terms are communicated to server 102, which locates the search terms in document 110. Server 102 also creates links to and between the occurrences of those search terms in document 110. As described above, other or additional search functions could be used in system 100. For example, search functions could allow the user to search for terms in the current document 110 being displayed, all documents 110 identified by server 102 during a prior search, all documents 110 in database 104, or all documents in system 100.

Page range indicator 208 identifies the pages of document 110 that are contained in document display 210. As described above, server 102 may provide a portion of a document 110 to client 108 when an occurrence of a search term is found in document 110. In the illustrated example, the search term was located on page one of the document 110, and server 102 retrieved a total of five pages from document 110. The number of pages contained in the page range may be established in any suitable manner, and other suitable page ranges may be used.

Document display 210 represents at least a portion of the contents of a document 110. In this example, document display 210 represents a frame in a web page. As a result, the information displayed in document display may change while the remaining portions of the web page remain undisturbed. In another embodiment, the web page need not include frames.

Server 102 may modify the contents of document 110 by providing various links and other information about the search terms. For example, server 102 may insert a counter 212 at the beginning of the displayed portion of document 110. Counter 212 identifies the number of times that the search term appears in the portion of document 110 contained in document display 210. Server 102 may also insert a link 214 to the first occurrence of the search term. This link 214 allows the user to jump to the first occurrence of a search term in the portion of document 110 contained in document display 210. In addition, server 102 links each occurrence of the search term to the next occurrence (if any), so document display 210 includes a link 216a representing the first occurrence of the search term.

In the example illustrated in FIG. 2A, the user could click on the link 214 at the top of document display 210 to find the first occurrence of the search term. When link 214 is selected, browser 112 may reposition the content of document display 210 so that link 216a is visible to the user. Browser 112 could reposition the content of document display 210 in any suitable manner. For example, browser 112 could reposition the content of document display 210 so that the first occurrence appears at the top of document display 210, in the middle of document display 210, at the bottom of document display 210, or in any other suitable position. In this example, browser 112 could refrain from repositioning the content of document display 210 because the first occurrence of the search term is already being displayed to the user. If the first occurrence of the search term is not already displayed in document display 210, browser 112 repositions the content of document display 210 so that it is visible to the user.

If the user clicks on the first occurrence of the search term, link 216a causes browser 112 to jump to the second occurrence of the search term. The second occurrence of the search term is shown in FIG. 2B. In FIG. 2B, the contents of document display 210 have been repositioned so that the second occurrence of the search term is displayed to the user. The second occurrence of the search term is illustrated as link 216b.

The user can then click on link 216b to be transported to the third and final occurrence of the search term in the current page range. The last occurrence of the search term is shown in FIG. 2C. In FIG. 2C, the third occurrence of the search term appears as link 216c. Because link 216c represents the last occurrence of the search term, the user may click on link 216c to be transported to the bottom of document display 210.

The bottom of document display 210 includes links 220 and 222. Link 220 allows the user to return to the top of the first page in document display 210, and link 222 allows the user to jump to the first occurrence of the search term in the current page range. In the example illustrated in FIG. 2C, the last link 216c is displayed along with the links 220, 222. If the user selects link 216c, browser 112 may or may not reposition the content of document display 210.

The example illustrated in FIGS. 2A through 2C shows how viewer 118 facilitates the navigation of search results. By providing link 214 at the beginning of document display 210, the user can quickly locate the first occurrence of the search term. By linking each occurrence of the search term to the next occurrence of the search term (if any), the user can easily traverse the portion of document 110 displayed in document display 210. By providing links 220, 222 at the end of document display 210, the user may return to various portions of the document 110.

Although FIGS. 2A through 2C illustrate example screen shots 200, various changes may be made to screen shots 200. For example, the contents of screen shots 200 are for illustration only. The contents may be arranged differently, and other or additional content may be added. Also, other or additional links may be used in conjunction with document 110. Further, FIGS. 2A through 2C illustrate the use of counter 212 and links 214, 216, 220, and 222. In another embodiment, a subset of this information may be used. As particular examples, viewer 118 could generate a web page that lacks counter 212 or a web page that lacks link 222.

Figure 3:
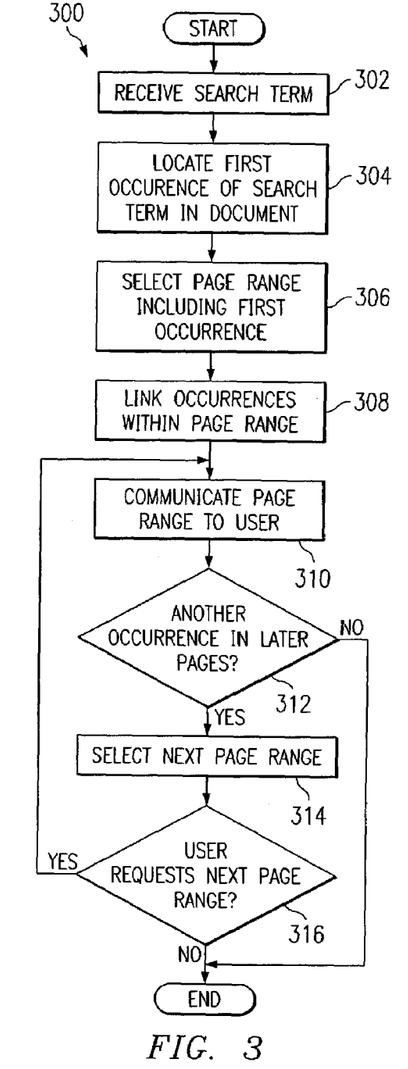
FIG. 3 is an exemplary flow diagram illustrating an example method for generating search results according to one embodiment of this disclosure.

FIG. 3 is an exemplary flow diagram illustrating an example method 300 for generating search results according to one embodiment of this disclosure. Although method 300 may be described with respect to system 100 of FIG. 1, method 300 may be used with other suitable systems.

Server 102 receives one or more search terms at step 302. This may include, for example, viewer 118 receiving the search terms from client 108 over network 106. Server 102 searches a document 110 and locates the first occurrence of a search term at step 304. This may include, for example, viewer 118 accessing database 104 and locating the appropriate document 110. If multiple search terms are provided, this may also include viewer 118 searching for the first instance of any of the terms in document 110.

Server 102 selects a range of pages from document 110 at step 306. This may include, for example, viewer 118 identifying the first page in document 110 that contains the first occurrence of a search term. This may also include viewer 118 determining the number of pages to include in the range.

Server 102 links the occurrences of the search terms in the page range at step 308. This may include, for example, viewer 118 generating a web page containing the selected page range. This may also include viewer 118 converting each occurrence of a search term into an "href" link to the next occurrence of a search term, if any. This may further include viewer 118 providing a link to the first occurrence at the beginning of the page range. In addition, this may further include viewer 118 adding one or more links at the bottom of the page range and linking the last occurrence of a search term to the bottom of the page range. Server 102 communicates the page range to the user at step 310. This may include, for example, viewer 118 communicating the web page containing the links and the page range to client 108 over network 106.

Server 102 determines whether an additional occurrence of a search term appears in the remainder of document 110 at step 312. This may include, for example, viewer 118 searching in the pages that follow the last page in the prior page range. If server 102 cannot locate an additional occurrence of a search term in the remainder of document 110, method 300 ends. Otherwise, an additional occurrence of a search term appears in the remainder of document 110. Server 102 selects another range of pages from document 110 at step 314. Server 102 then waits for the user to indicate that the next range of pages is desired. When the user indicates that the next range of pages is desired, server 102 returns to step 310 and communicates the new page range to client 108.

Although FIG. 3 illustrates one example of a method 300 for generating search results, various changes may be made to method 300. For example, method 300 assumes the user is requesting that server 102 search a specific document for a search term. A similar method can be used when the user requests that server 102 search multiple documents 110. As a particular example, the user may request that server 102 search all documents 110 in database 104 for a search term. Server 102 may provide the user with a list of documents 110 satisfying the search and allow the user to select one of the documents 110. When the user selects a document 110, server 102 could perform part or all of method 300 to link the search terms in the selected document 110. Also, server 102 could provide the entire document 110 to client 108, and server 102 would not need to retrieve different page ranges from document 110.

FIG. 4 is an exemplary flow diagram illustrating an example method 400 for linking search results according to one embodiment of this disclosure. Although method 400 may be described with respect to system 100 of FIG. 1 generating the web pages shown in FIGS. 2A through 2C, method 400 may be used with other suitable systems and web pages.

Server 102 inserts one or more links at the beginning of a page range from document 110 at step 402. This may include, for example, viewer 118 locating the first occurrence of a search term and inserting a link 214 to the first occurrence of the search term. In a particular embodiment, the first link 214 represents an HTML "href" link.

Server 102 selects an occurrence of a search term at step 404. This may include, for example, viewer 118 selecting the first occurrence of the search term. Server 102 determines whether the selected occurrence represents the last occurrence of a search term at step 406. This may include, for example, viewer 118 searching the remaining portion of document 110 and determining whether another instance of a search term exists.

If the selected occurrence of the search term is not the last occurrence, server 102 links the current occurrence to the next occurrence at step 408. This may include, for example, viewer 118 converting the first occurrence into an "href" link 216 that associates the selected occurrence and the position of the next occurrence. As a particular example, the link 216 may link directly to the position of the next occurrence or to the next occurrence itself. Server 102 selects the next occurrence at step 410. Server 102 returns to step 406 to repeat the linking process. In this way, each occurrence of a search term is linked to the next occurrence of a search term until the last occurrence is reached.

When the last occurrence of a search term is reached, server 102 links the last occurrence to the end of the page range from document 110 at step 412. This may include, for example, viewer 118 using an "href" link 216 to associate the last occurrence with the end of the retrieved portion of document 110. Server 102 inserts one or more links at the end of the page range at step 414. This may include, for example, viewer 118 inserting links 220, 222 into the web page containing document 110. Method 400 then ends. The portion of document 110 to be displayed to the user now contains links that allow the user to traverse through the occurrences of the search terms in that portion of the document 110.

Although FIG. 4 illustrates one example of a method 400 for linking search results, various changes may be made to method 400. For example, method 400 includes generating links at the beginning and end of a page range of document 110. Either or both of these links may be omitted. Also, server 102 could insert additional information into the web page, such as counter 212.

Figure 5:
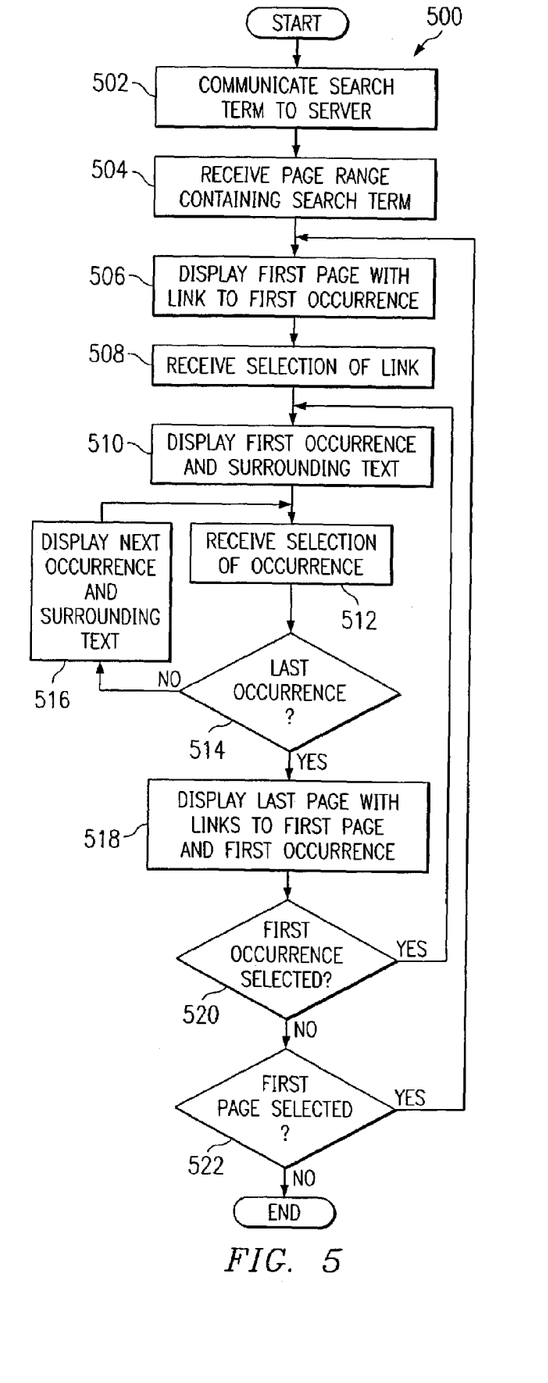
FIG. 5 is an exemplary flow diagram illustrating an example method for navigating search results according to one embodiment of this disclosure.

FIG. 5 is an exemplary flow diagram illustrating an example method 500 for navigating search results according to one embodiment of this disclosure. Although method 500 may be described with respect to system 100 of FIG. 1 and the web pages shown in FIGS. 2A through 2C, method 500 may be used with other suitable systems and web pages.

Client 108 communicates one or more search terms to server 102 at step 502. This may include, for example, browser 112 displaying a form to the user of client 108 and the user entering one or more search terms in the form. Client 108 receives one or more document pages containing the search terms from server 102 at step 504. This may include, for example, browser 112 receiving a web page that contains a portion of a document 110. Client 108 displays the first page of the received portion of document 110 to the user at step 506. This may include, for example, browser 112 displaying the web page to the user, where the web page includes a link 214 to the first occurrence of a search term. The first occurrence of a search term may or may not also be visible to the user.

Client 108 receives a selection of the link 214 at step 508. This may include, for example, the user using a computer mouse or other input device to select the link 214. Client 108 displays the first occurrence of a search term and any surrounding text to the user at step 510. This may include, for example, browser 112 repositioning the content of the web page or a frame in the web page so that the first occurrence of the search term is visible to the user. This may also include browser 112 displaying the first occurrence of the search term as a link 216, such as by highlighting and underlining the search term.

Client 108 receives a selection of the occurrence at step 512. This may include, for example, the user using the mouse to click on the first occurrence of the search term. If the selected occurrence does not represent the last occurrence of a search term at step 514, server 102 displays the next occurrence of a search term and any surrounding text at step 516. This may include, for example, browser 112 repositioning the content of the web page or a frame in the web page so that the next occurrence of the search term is visible to the user. Server 102 returns to step 512 to await the selection of another link.

If the selected occurrence does represent the last occurrence of a search term at step 514, server 102 jumps to the bottom of the document display 210 and displays links 220, 222 at step 518. The user may then select to jump to the top of the document display 210, jump to the first occurrence of a search term, or perform another function. If the first occurrence is selected, server 102 returns to step 506. If the top of the document display 210 is selected, server 102 returns to step 508.

Although FIG. 5 illustrates one example of a method 500 for navigating search results, various changes may be made to method 500. For example, method 500 illustrates client 108 determining whether the selected occurrence is the last occurrence at step 514. In one embodiment, this simply means that client 108 follows the link 216 associated with the occurrence, and client 108 need not actively determine whether the link 216 is the last link 216 in the web page. If the occurrence does represent the last occurrence of a search term, the link 216 causes client 108 to jump to the end of document display 210. Otherwise, the link 216 causes client 108 to jump to the next occurrence. Also, while method 500 shows that the user may select links at the beginning and end of the page range, one or both sets of links can be omitted.

While the present disclosure has been described in terms of preferred embodiments and generally associated methods, alterations and permutations of the preferred embodiments and method will be apparent to those skilled in the art. Accordingly, the above description of preferred exemplary embodiments does not define or constrain the present disclosure. Other changes, substitutions, and alterations are also possible without departing from the spirit and scope of the present disclosure, as defined by the following claims.

What is claimed is:

1. A method for navigating search results, the search results including at least a first occurrence of a search term in a document and a second occurrence of the search term, the document having a plurality of pages, the method comprising:
   identifying a first page from among the plurality of pages, the identified first page including the first occurrence;
   retrieving a range of pages from among the plurality of pages, the range of pages beginning with the identified first page and encompassing less than all the pages in the document;
   generating a web page including the range of pages, wherein a first hyperlink appears in the web page at a position at a beginning of the range of pages and links to a position of the first occurrence, and wherein the first occurrence appears in the web page as a second hyperlink that links to a position of the second occurrence; and
   communicating the web page for display to a user.

2. The method of claim 1, wherein
   the web page further includes a third hyperlink and a fourth hyperlink at an end of the range of pages, wherein the third hyperlink links to the position of the first occurrence, and wherein the fourth hyperlink links to the position at the beginning of the range of pages.

3. The method of claim 2, wherein the second occurrence appears in the web page as a fifth hyperlink that links to a position of the third and fourth hyperlinks.

4. The method of claim 1, wherein
   the web page further includes:
      a third hyperlink at an end of the range of pages, wherein the third hyperlink links to the position of the first occurrence; and
      a fourth hyperlink at the end of the range of pages, wherein the fourth hyperlink links to the position at the beginning of the range of pages; and
   the second occurrence appears in the web page as a fifth hyperlink that links to a position of the third and fourth hyperlinks.

5. The method of claim 1, wherein
   the second occurrence appears in the web page as a third hyperlink that links to a position of a third occurrence of the search term.

6. The method of claim 1, wherein:
   the range of pages is a first range of pages and the web page is a first web page,
   the search results further include additional occurrences of the search term in the document, and
   the method further comprises:
      identifying a second page from among the plurality of pages after the first web page is communicated for display to the user, wherein the identified second page falls outside the first range of pages and includes the additional occurrences;
      retrieving a second range of pages from among the plurality of pages, the second range of pages beginning with the identified second page and encompassing less than all the pages in the document;
      generating a second web page including the second range of pages; and
      communicating the second web page for display to the user.

7. The method of claim 1, wherein the search results are identified in a document specified by the user.

8. The method of claim 1, wherein:
   the document is a first document from among a plurality of documents, and
   the method further comprises:
      making a list of the plurality of documents available to the user, each of the plurality of documents including at least one occurrence of the search term; and
      receiving a selection of the first document from the list of the plurality of documents by the user.

9. The method of claim 1, wherein the web page includes at least one frame, the at least one frame including the range of pages.

10. The method of claim 9, wherein selection of the second hyperlink by the user causes a browser to reposition the range of pages within the at least one frame to the position of the second occurrence.

11. The method of claim 1, wherein the first occurrence is a result of a search for a first search term and the second occurrence is a result of a search for a second search term.

12. Software for navigating search results, the search results including at least a first occurrence of a search term in a document and a second occurrence, the document having a plurality of pages, the software embodied on at least one computer readable medium and operable when executed by at least one processor to:
   identify a first page from among the plurality of pages, the identified first page including the first occurrence;

retrieve a range of pages from among the plurality of pages, the range of pages beginning with the identified first page and encompassing less than all the pages in the document;

generate a web page including the range of pages, wherein a first hyperlink appears in the web page at a position at a beginning of the range of pages and links to a position of the first occurrence, and wherein the first occurrence appears in the web page as a second hyperlink that links to a position of the second occurrence; and communicate the web page for display to a user.

13. The software of claim 12, wherein the web page further includes a third hyperlink and a fourth hyperlink at an end of the range of pages, wherein the third hyperlink links to the position of the first occurrence, and wherein the fourth hyperlink links to the position at the beginning of the range of pages.

14. The software of claim 13, wherein the second occurrence appears in the web page as a fifth hyperlink that links to a position of the third and fourth hyperlinks.

15. The software of claim 12, wherein the web page further includes:

a third hyperlink at an end of the range of pages, wherein the third hyperlink links to the position of the first occurrence; and a fourth hyperlink at the end of the range of pages, wherein the fourth hyperlink links to the position at the beginning of the range of pages; and the second occurrence appears in the web page as a fifth hyperlink that links to a position of the third and fourth hyperlinks.

16. The software of claim 12, wherein the second occurrence appears in the web page as a third hyperlink that links to a position of a third occurrence of the search term.

17. The software of claim 12, wherein:

the range of pages is a first range of pages and the web page is a first web page, the search results further include additional occurrences of the search term in the document, and the software is further operable to:

identify a second page from among the plurality of pages after the first web page is communicated for display to the user, wherein the identified second page falls outside the first range of pages and includes the additional occurrences;

retrieve a second range of pages from among the plurality of pages, the second range of pages beginning with the identified second page and encompassing less than all the pages in the document;

generate a second web page including the second range of pages; and communicating the second web page for display to the user.

18. A system for navigating search results, the search results including at least a first occurrence of a search term in a document and a second occurrence of the search term, the document having a plurality of pages, the system comprising:

a memory operable to store the document; and one or more processors collectively operable to: = identify a first page from among the plurality of pages, the identified first page including the first occurrence;

retrieve a range of pages from among the plurality of pages, the range of pages beginning with the identified first page and encompassing less than all the pages in the document;

generate a web page including the range of pages, wherein a first hyperlink appears in the web page at a position at a beginning of the range of pages and links to a position of the first occurrence, and wherein the first occurrence appears in the web page as a second hyperlink that links to a position of the second occurrence; and communicate the web page for display to a user.

19. The system of claim 18, wherein the web page further includes a third and a fourth hyperlink at an end of the range of pages, wherein the third hyperlink links to the position of the first occurrence, and wherein the fourth hyperlink links to the position at the beginning of the range of pages.

20. The system of claim 19, wherein the second occurrence appears in the web page as a fifth hyperlink that links to a position of the third and fourth hyperlinks.

21. The system of claim 18, wherein the web page further includes:

a third hyperlink at an end of the range of pages, wherein the third hyperlink links to the position of the first occurrence; and a fourth hyperlink at the end of the range of pages, wherein the fourth hyperlink links to the position at the beginning of the range of pages; and the second occurrence appears in the web page as a fifth hyperlink that links to a position of the third and fourth hyperlinks.

22. The system of claim 18, wherein the second occurrence appears in the web page as a third hyperlink that links to a position of a third occurrence of the search term.

23. The system of claim 18, wherein:

the range of pages is a first range of pages and the web page is a first web page, the search results further include additional occurrences of the search term in the document, and the one or more processors are further collectively operable to:

identify a second page from among the plurality of pages after the first web page is communicated for display to the user, wherein the identified second page falls outside the first range of pages and includes the additional occurrences;

retrieve a second range of pages, the second range of pages beginning with the identified second page and encompassing less than all the pages in the document;

generate a second web page including the second range of pages; and communicate the second web page for display to the user.

24. A system for navigating search results, the search results including at least a first occurrence of a search term in a document and a second occurrence of the search term, the document having a plurality of pages, the system comprising:

means for identifying a first page from among the plurality of pages, the identified first page including the first occurrence;

means for retrieving a range of pages from among the plurality of pages, the range of pages beginning with the identified first page and encompassing less than all the pages in the document;

means for generating a web page including the range of pages, wherein a first hyperlink appears in the web page at a position at a beginning of the range of pages and links to a position of the first occurrence, and wherein the first occurrence appears in the web page as a second hyperlink that links to a position of the second occurrence; and means for communicating the web page for display to a user.

25. A method for navigating search results, the search results including at least a first occurrence of a search term in a document and a second occurrence of the search term, the document having a plurality of pages, the method comprising:

receiving a web page including a range of pages from among the plurality of pages, the range of pages encompassing less than all the pages in the document, wherein a first hyperlink appears in the web page at a position at a beginning of the range of pages and links to a position of the first occurrence, and wherein the first occurrence appears in the web page as a second hyperlink on a first page of the range of pages, wherein the second hyperlink links to a position of the second occurrence, wherein the second occurrence appears in the web page on one of the range of pages;

displaying the web page to a user;

receiving a selection of the first hyperlink; and repositioning the web page to the position of the first occurrence.

26. The method of claim 25, further comprising:

receiving a selection of a third hyperlink that links to the position at the beginning of the range of pages; and repositioning the web page to the position at the beginning of the range of pages.

27. The method of claim 26, wherein:

the second occurrence appears in the web page as a fourth hyperlink that links to a position of the third hyperlink, and the method further comprises:

receiving a selection of the fourth hyperlink; and repositioning the web page to the position of the third hyperlink.

28. The method of claim 25, wherein:

the second occurrence appears in the web page as a third hyperlink that links to a position of a third occurrence of the search term, and the method further comprises:

receiving a selection of the third hyperlink; and repositioning the web page to the position of the third occurrence.

29. The method of claim 25, further comprising setting a size of the range of pages.

30. A method for navigating search results, the search results including at least a first occurrence of a search term in a document and a second occurrence of the search term, the document having a plurality of pages, the method comprising:

identifying a first page from among the plurality of pages, the identified first page including the first occurrence;

retrieving a range of pages from among the plurality of pages, the range of pages beginning with the identified first page and encompassing less than all the pages in the document;

generating a web page including the range of pages, wherein a first hyperlink appears in the web page at a position at a beginning of the range of pages and links to a position of the first occurrence, and wherein the first occurrence appears in the web page as a second hyperlink that links to a position of the second occurrence; and communicating the web page for display to a user.

* * * * *